United States Patent
Purdy et al.

[15] 3,663,956
[45] May 16, 1972

[54] DIGITAL PHASE MEASUREMENT COMPUTATION CIRCUIT

[72] Inventors: Bruce W. Purdy, Bristol; Donato Perti, Portsmouth, both of R.I.

[73] Assignee: Ocean Data Equipment Corp., East Providence, R.I.

[22] Filed: July 1, 1970

[21] Appl. No.: 51,588

[52] U.S. Cl. ..................324/83 D, 328/133, 235/151.31
[51] Int. Cl. ..................G01r 25/00, H03d 13/00
[58] Field of Search..........324/83; 328/133; 235/151.31

[56] References Cited

UNITED STATES PATENTS 3,286,176  11/1966  Birnboim ..................324/83 D

*Primary Examiner*—Alfred E. Smith
*Attorney*—William Frederick Werner

[57] ABSTRACT

Circuitry for accurately measuring the phase angle between two sinusoidal signals is disclosed. The two sinusoidal signals are squared by separate axis or zero crossing detectors. The two squared signals are further processed to obtain a first pulse $T$, the duration of which is equal to the period of the signals under test and a second signal $\Delta t$, the duration of which is equal to the time difference between the two signals under test. The $T$ and $\Delta t$ pulses are used to gate a high frequency clock and the resulting clock pulses, or counts, are incremented into two binary counters (a $T$ counter and a $\Delta t$ counter). Thus, a number proportional to the period $T$ of the signals under test ($T$ count) is stored in the $T$ counter and a number proportional to the time difference between the two signals under test ($\Delta t$ count) is stored in the $\Delta t$ counter. The $T$ and $\Delta t$ counts are preset into respective binary programmable dividers. The programmable dividers have the property of dividing the frequency of an input clock ($fc$) by the preset number. Thus, the output of one divider is $fc/T$ and the output of the other counter is $fc/\Delta t$. The $fc/T$ count is fed into a binary to decimal counter and the $fc/\Delta t$ count is fed into a binary counter. Both counters are disabled when 3,600 $fc/\Delta t$ clock pulses have been counted in the binary counter. The number stored in the binary to decimal counter is the phase angle in tenths of a degree since the following computation has been performed: $\theta = \Delta t / T \times 3,600$. A decimal display device is connected to the output of the binary coded decimal counter to provide a visual display of the phase angle reading.

14 Claims, 3 Drawing Figures

Patented May 16, 1972

DIGITAL PHASE MEASUREMENT COMPUTATION CIRCUIT

BACKGROUND OF THE INVENTION

This invention relates to phase meters and more specifically to circuitry for measuring and computing the phase angle between two sinusoidal signals.

Various different types of phase meters and phase measuring circuitry are known in the art. In some prior art systems, the phase of an input signal is compared with the phase of a reference signal or two input signals are compared in conventional phase comparison circuitry to obtain the phase difference between the two signals. These phase comparison circuits are old and well known in the art. More recently phase measuring circuits using multivibrators and counters have been devised. One such system is described in U.S. Pat. No. 3,209,254 to Marcel Hossmann.

With phase measuring circuits such as the circuit disclosed in the Hossmann patent, noted above, repeated phase angle measurements are taken and an arithmetic mean is obtained from these measurements. With this invention repeated measurements are unnecessary. An accurate phase angle measurement, in tenths of degrees is obtained within two cycles of the input signals.

SUMMARY OF THE INVENTION

In the phase angle measuring and computing method and apparatus described herein, two sinusoidal signals are squared by separate axis or zero crossing detectors. A first signal ($T$) the duration of which is equal to the period of the input signals is generated by a first flip-flop circuit from one of the squared signals and a second signal ($\Delta t$) the duration of which is equal to the time difference between the two input signals is generated by a second flip-flop circuit from both of the squared signals. The $T$ and $\Delta t$ signals gate on a high frequency clock and these signals are incremented into separate binary counters ($T$ counter and $\Delta t$ counter) by the high frequency clock. The counts in the $T$ and $\Delta t$ counters are preset into separate programmable dividers. The programmable dividers divide the frequency of a clock ($fc$) by the preset numbers. Thus, the output of one divider is $fc/T$ and the output of the second divider is $fc/\Delta t$. The $fc/T$ signal is fed to a binary to decimal counter and the $fc/\Delta t$ is fed to a third binary counter. Both of these counters are disabled when 3,600 $fc/\Delta t$ pulses have been counted by the third binary counter. The number stored in binary coded decimal counter when it is disabled is the phase angle between the input signals in tenths of a degree.

It is, therefore, an object of this invention to provide apparatus for measuring the phase angle between two signals.

Another object of this invention is to provide apparatus for measuring and computing the phase signal between two signals.

A further object of this invention is to provide the apparatus for measuring and computing the phase angle between two sinusoidal signals.

BRIEF DESCRIPTION OF THE DRAWING

The above mentioned and other objects of the invention will become readily apparent from the following detailed description of the invention when read in conjunction with the annexed drawing in which.

DESCRIPTION OF THE INVENTION

Figure 1:
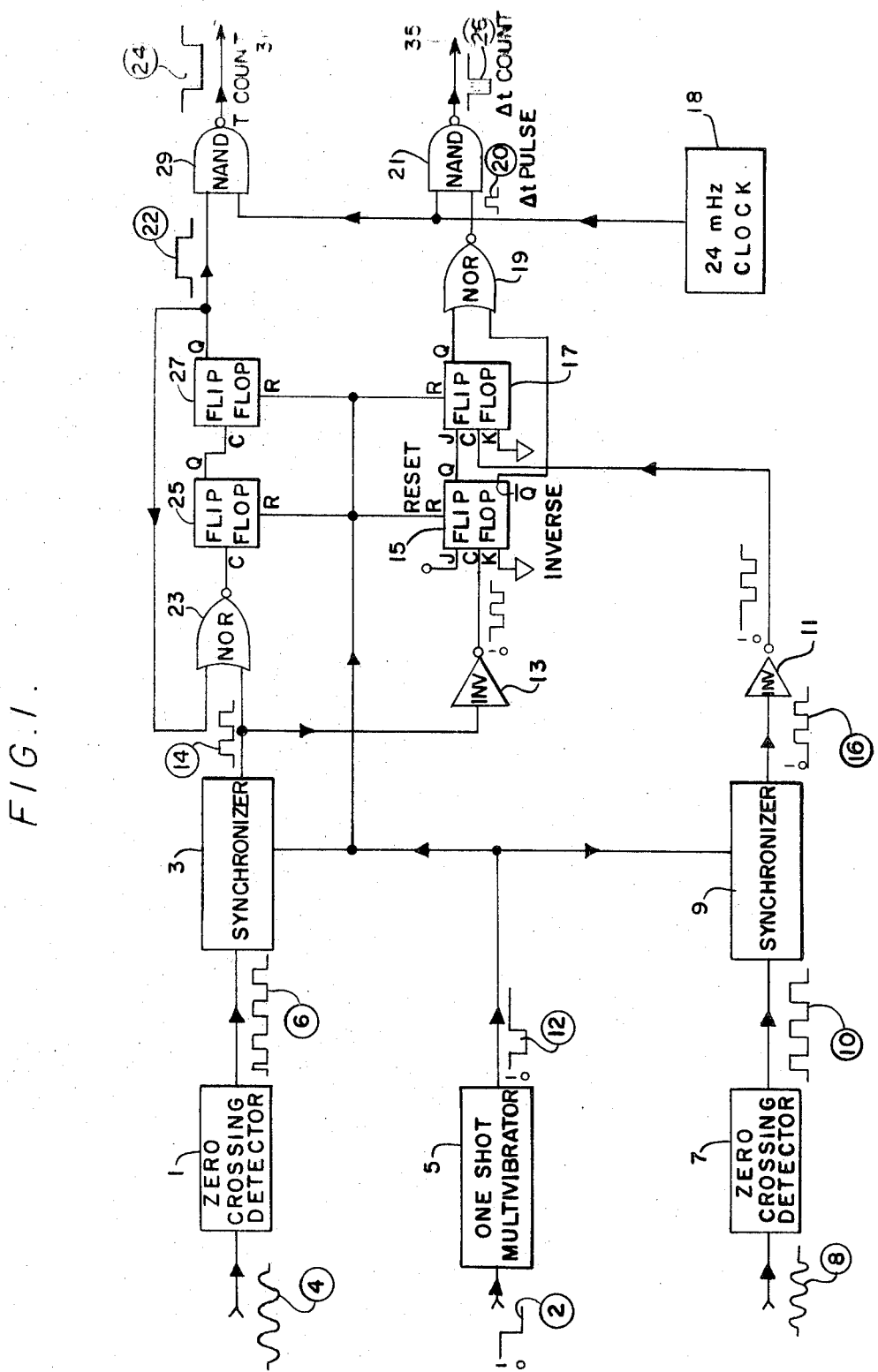
FIG. 1 shows in block diagram form a preferred embodiment of the phase data acquisition circuitry of the invention.
Figure 2:
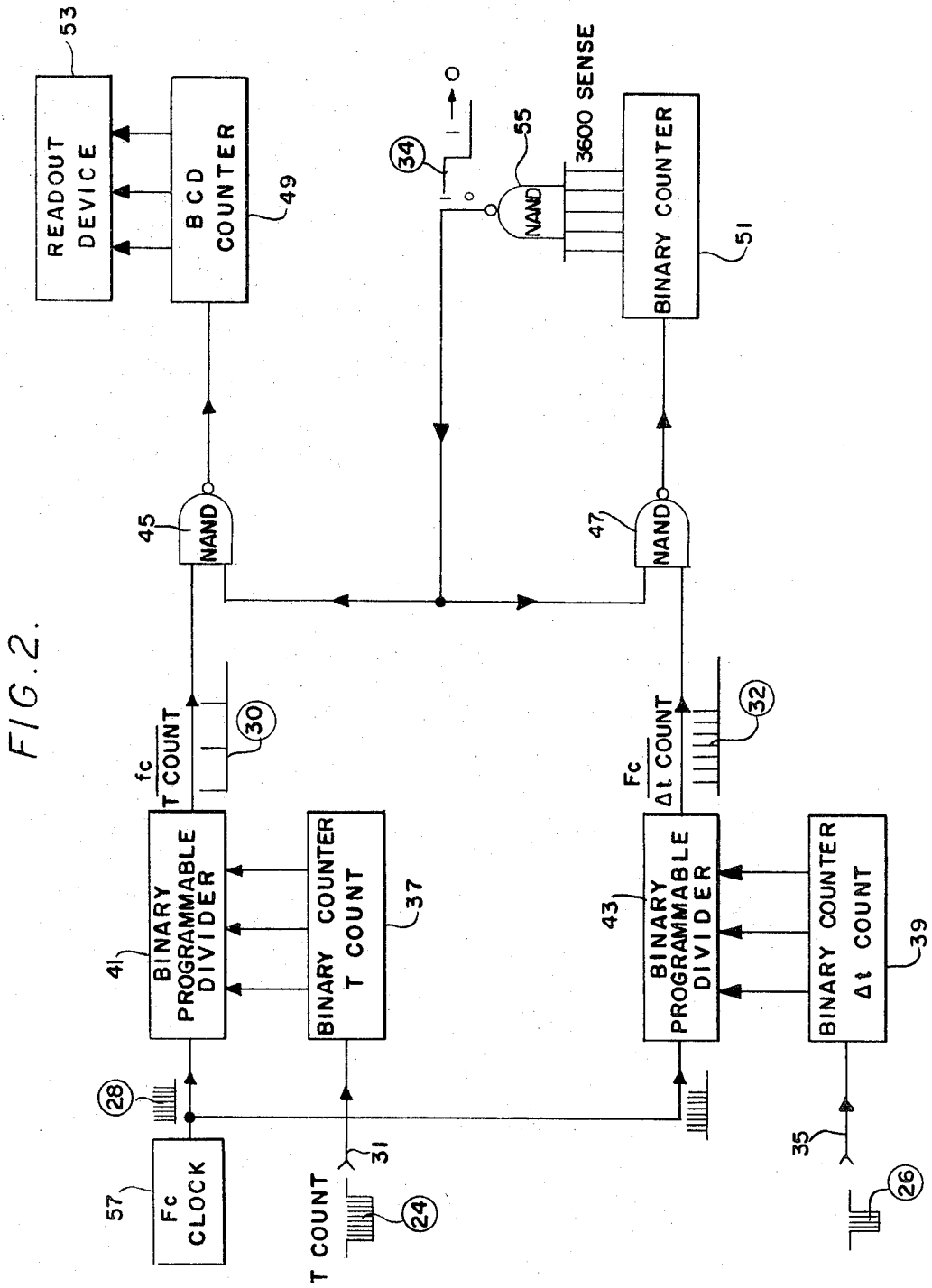
FIG. 2 shows in block diagram form a preferred embodiment of the phase computation circuitry of the invention.

A preferred embodiment of the entire invention is shown in FIGS. 1 and 2. Leads 31 and 35 of FIG. 1 are connected to corresponding leads 31 and 35, respectively, of FIG. 2. The part of the circuitry shown in FIG. 1 is called the phase data acquisition circuitry. In this part of the invention the data necessary to compute the phase angle is derived. The data acquired in the FIG. 1 circuitry is applied to the circuitry of FIG. 2 for computing and displaying the phase angle.

Referring to FIG. 1, a first sinusoidal signal is applied to an axis or zero crossing detector 1. The output of zero crossing detector 1 is connected to the input of a first synchronizer 3. In a similar fashion a second sinusoidal signal having the same period as the signal applied to zero crossing detector 1 is applied to a second axis or zero crossing detector 7. The output of zero crossing detector 7 is connected to the input of a second synchronizer 9. Synchronizers 3 and 9 are controlled by a one shot multivibrator 5. The output from multivibrator 5 is connected to both synchronizers.

The output of synchronizer 3 is connected to one of two inputs of a NOR gate 23. The output of NOR gate 23 is connected to the trigger input C of a flip-flop circuit 25 and the output Q of flip-flop 25 is connected to the trigger input C of a flip-flop circuit 27. A feedback path is provided between the output Q of flip-flop 27 and the second input of NOR gate 23. The output Q of flip-flop 27 is connected to one of two inputs of a NAND gate 29.

The output of synchronizer 3 is also connected to trigger input C of a third flip-flop circuit 15 through an inverter 13. The Q output of flip-flop 15 is connected to the J input of a fourth flip-flop circuit 17. The inverted or $\overline{Q}$ output of flip-flop 15 is connected to one of two inputs of a second NOR gate 19.

The output of synchronizer 9 is connected to the trigger input C of flip-flop 17 through inverter 11 and the Q output of flip-flop 17 is connected to the second input of NOR gate 19. The output of NOR 19 is connected to one of two inputs of a second NAND gate 21. The second input of NAND gates 21 and 29 are both connected to the output of a high frequency clock 18. In this case the clock 18 is labeled as a 24MHz clock.

Figure 3:
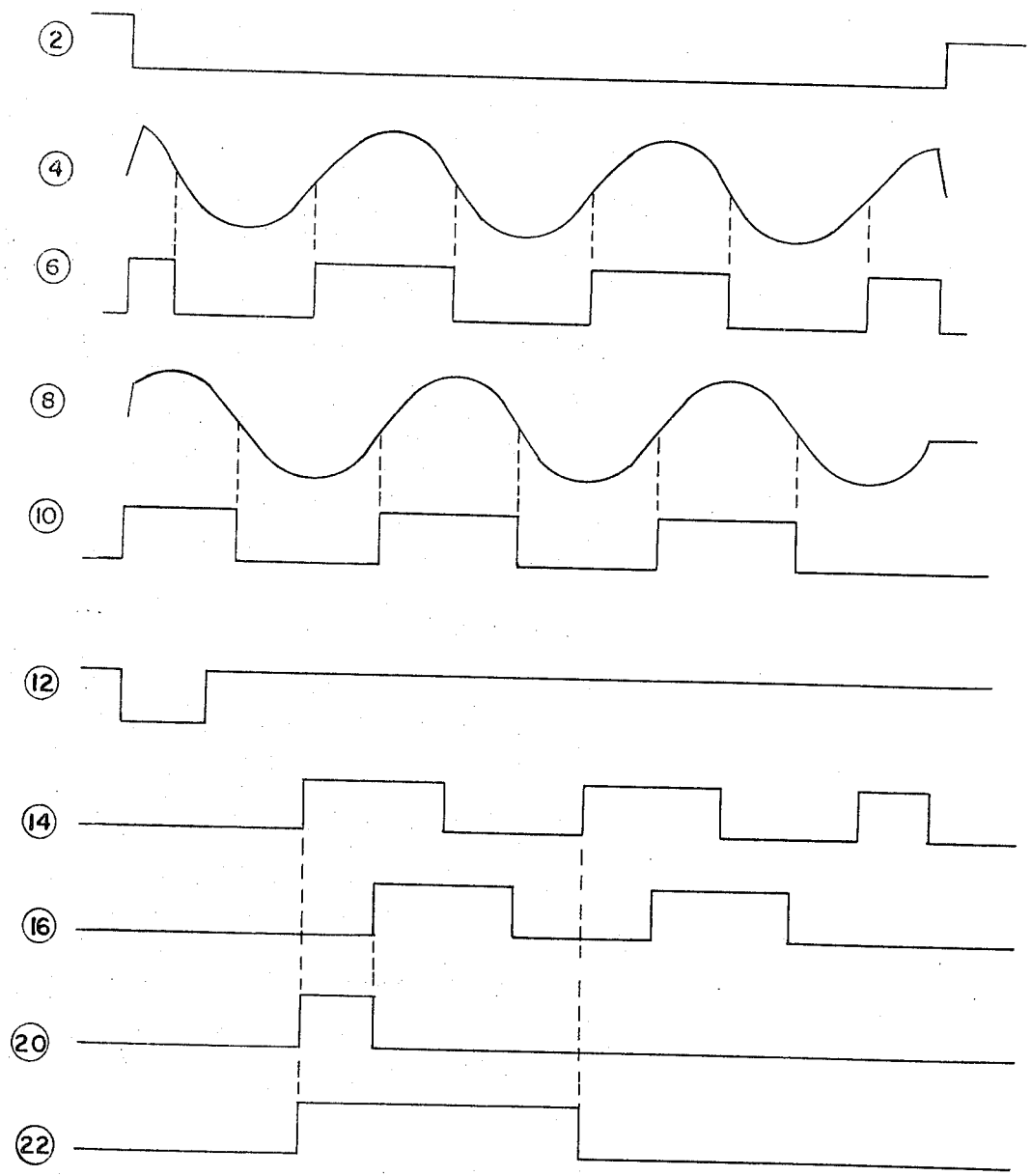
FIG. 3 shows the timing relationship of the waveforms at various points along the circuit of FIG. 1.

Now that the circuit components of FIG. 1 have been described, the operation of the circuitry of FIG. 1 will be described with reference to both FIGS. 1 and 3. FIG. 3 shows the timing relationship of the waveforms at various points in the circuitry of FIG. 1. The waveforms of FIG. 3 are also shown at a reduced scale in FIG. 1.

A sinusoidal signal 4 is applied to the input of zero crossing detector 1 and a sinusoidal signal 8 is applied to the input of zero crossing detector 7. Sine waves 4 and 8 are gated into the two zero axis crossing detectors by any conventional gating means. The gating means do not form a part of this invention and since any known gating means can be used, these gates are therefore not shown in FIG. 1. The AC input signals 4 and 8 are squared by zero crossing detectors 1 and 7, respectively. Zero crossing detectors 1 and 7 are conventional zero crossing detectors. The output of such a detector is a pulse which changes logic state at every axis crossing of the input signal.

Since input signals 4 and 8 are not necessarily gated at the zero crossing, synchronizers 3 and 9 are provided to ensure that the axis crossings used to obtain the phase data output are not effected by initial transients. To accomplish this synchronization, multivibrator 5 is triggered by trigger pulse 2 to obtain a synchronizing pulse 12 at the beginning of the AC input pulses. Synchronizing pulse 12 while in the zero logic state disables synchronizers 3 and 9 during the initial transient responses so that the outputs from synchronizers 3 and 9 remain in the zero state until the first zero axis crossing pulse after synchronizing pulse 12 returns to the logic 1 state. At this time, synchronizers 3 and 9 are enabled and output pulses 14 and 16 appear at the outputs of synchronizers 3 and 9, respectively. This sequence of operation is clearly shown in FIG. 3. The first pulse of waveforms 14 is not generated until the first positive axis crossing of waveform 4 after sync pulse 12 returns to the logic state 1. Similarly the first pulse of waveform 16 is not generated until the first positive axis crossing of waveform 8 after sync pulse 12 has returned to the logic 1 state.

Pulses 14 are then gated to the trigger input of flip-flop 25 through NOR gate 23. The output of flip-flop 25 is applied to the input of flip-flop 27 to produce a pulse 22 the duration of which is equal to the period T of the input signals 4 and 8.

The output of synchronizer 3 is also applied to the trigger input of flip-flop 15 through inverter 13. The Q output of flip-flop 15 is applied to the J input of flip-flop 17. The output pulses 16 of synchronizer 9 are applied to the trigger input of flip-flop 17. The Q output of flip-flop 17 and the $\overline{Q}$ output of flip-flop 15 are applied to separate inputs of NOR gate 19. Therefore, the output of NOR gate 19 is a pulse 20, the duration of which is equal to the time difference $\Delta t$ between the input signals 4 and 8. The relationship of pulses 20 and 22 with respect to the input pulses is apparent from waveforms 14, 16, 20 and 22 of FIG. 3.

Pulses 20 and 22 gate on high frequency clock 18. The output of clock 18 and pulse 22 are applied to separate inputs of NAND gate 29. The output signals of NAND gate 24 are count pulses 24 ($T$ count pulses). The output of clock 18 and the output of NOR gate 19 are applied to separate inputs of NAND gate 21. The output signals of NAND gate 21 are count pulses 26 ($\Delta t$ count pulses). The $T$ count pulses 24 and the $\Delta t$ count pulses are applied to the circuitry of FIG. 2 via leads 31 and 35, respectively. $T$ count pulses 24 and $\Delta t$ count pulses 26 are not shown in FIG. 3. However, these pulses are shown in FIGS. 1 and 2.

FIG. 2 shows the computation part of the invention and comprises a $T$ count binary counter 37 having its input connected to lead 31 and a $\Delta t$ count binary counter 39 havings its input connected to lead 35. Binary counter 37 is connected to a binary programmable divider 41 and binary counter 39 is connected to binary programmable divider 43. An $fc$ clock signal source 57 has its output connected to both of the dividers 39 and 41.

The output of divider 41 is connected to one input of a NAND gate 45. The output of NAND gate 45 is connected to a binary coded decimal counter 49 and counter 49 is connected to a readout device 53.

The output of divider 43 is connected to one input of NAND gate 47 and the output of NAND gate 47 is connected to a binary counter 51. The outputs of binary counter 51 are connected to the inputs of a NAND gate 55. The output of NAND gate 55 is connected to the second input of both NAND gate 45 and NAND gate 47.

The circuitry of FIG. 2 operates in the following manner: $T$ count pulses 24 are incremented into $T$ count binary counter 37 and the $\Delta t$ count pulses 26 are incremented into $\Delta t$ count binary counter 39. Thus, a number proportional to the period $T$ ($T$ count) is stored in counter 37 and a number proportional to the time difference between input signals 4 and 8 ($\Delta t$ count) is stored in counter 39. The $T$ count and $\Delta t$ count are preset into programmable dividers 41 and 43, respectively. Clock pulses 28 having a frequency $fc$ are applied from $fc$ clock 57 to both of the dividers. Programmable dividers 41 and 43 have the property of dividing the frequency of clock signals 28 by the preset number. Thus, the frequency of the output pulses 30 of divider 41 is $fc/T$ count and the frequency of the output pulses 32 from divider 43 is $fc/\Delta t$ count. $fc/T$ count pulses 30 are applied to binary coded decimal counter 49 through NAND gate 45 and the $fc/\Delta t$ count pulses 32 are applied to binary counter 51 through NAND gate 47. Both counters 49 and 51 are disabled by NAND gate 55 when 3,600 $fc/\Delta t$ count pulses have been counted in binary counter 51. At this point the output of NAND gate 55 changes from logic 1 state to logic 0 state and disables counters 49 and 51 by means of NAND gates 45 and 47, respectively. When counters 49 and 51 are disabled, the number stored in counter 49 is the phase angle between input signals 4 and 8 in tenths of degrees since the circuitry of FIG. 2 will have performed the following computation: $\theta = 3,600\ \Delta t/T$.

To more clearly illustrate the computation, assume that the frequency of input signals 4 and 8 is 6KHz, that the phase shift between the signals is 90°, that the frequency $fc$ of clock 57 is 8MHz and that the frequency of clock 18 is 24MHz as indicated in FIG. 1. Then:

$T = 1/6\text{KHz} = 166.6\ \mu s$
$\Delta t = \frac{1}{4}(T) = 41.65\ \mu s$
$\therefore T\text{ count} = 24\text{MHz}/6\text{KHz} = 4,000$
$\Delta t\text{ count} = \frac{1}{4}(T\text{ count}) = 1,000$
$\therefore fc/T\text{ count} = 8\text{MHz}/4,000 = 2,000\text{Hz}$
$fc/\Delta t\text{ count} = 8\text{MHz}/1,000 = 8,000\text{Hz}$ Thus, the time required to count up to 3,600 at a 8,000Hz rate is:

3,600/8,000 = 0.45 sec and the number accumulated in the binary coded decimal counter 49 is:

2,000HZ × 0.45 sec = 900 which is the phase angle in tenths of a degree. Although the computation time is 450 ms., the data fed into the computation circuitry of FIG. 2 was acquired within two cycles of input signals 4 and 8.

While the invention has general utility as a phase meter, it is particularly suited to the measurement of phase angles between gated (pulsed) signals used for sonar and other acoustic applications, since the phase angle is acquired within two cycles of the signal frequency. From this phase angle measurement the characteristics of a sonar transducer can be readily established. For example, the voltage across a sonar transducer can be measured and gated into one of the zero axis crossing detectors. The current to the transducer is measured and a second voltage representative of the current in the transducer is measured and gated into the second zero axis crossing detector. This second voltage can be obtained in a conventional manner using a transformer having its primary in series with the transducer and its input signal source. Since the magnitude of the current and voltage are measured by any conventional manner and the apparatus of this invention measures the phase angle between the current and voltage, the characteristics of the sonar transducer can be calculated (i.e., $Z = V/I$ and $P = VI \cos \theta$).

While the invention has been described with reference to a preferred embodiment, it will be obvious to those skilled in the art that various modifications and changes can be made to the described embodiment without departing from the spirit and scope of the invention as set forth in the claims.

What is claimed is:

1. A phase meter for measuring the phase angle between two AC signals comprising: first means to square one of said two ac signals; second means to square the other of said two AC signals; means coupled to said first squaring means for deriving a pulse T the duration of which is equal to the period of said ac signals; means coupled to said first squaring means and to said second squaring means for deriving a pulse $\Delta t$, the duration of which is equal to the time difference between said two AC signals; a pulse source, means responsive to said pulse $T$ to divide pulses from said pulse source by the duration of said pulse $T$, and means responsive to said pulse $\Delta t$ to divide pulses from said pulse source by the duration of said pulse $\Delta t$ and at a predetermined result to terminate said division responsive to pulse $T$ so that the result of said division responsive to pulse $T$ represents the computation of the phase angle between said two ac signals.

2. A phase meter as defined in claim 1 wherein said first and second squaring means are zero axis crossing detectors.

3. A phase meter as defined in claim 2 wherein said means to derive said pulse $T$ includes first and second serially connected flip-flop circuits.

4. A phase meter as defined in claim 3 wherein said means to derive said pulse $\Delta t$ includes a third flip-flop circuit having an input coupled to said first squaring means and a fourth flip-flop circuit having a first input connected to the output of said third flip-flop circuit and a second input coupled to said second squaring means.

5. A phase meter as defined in claim 1 wherein said pulse $T$ and said pulse $\Delta t$ are incremented by a pulse source responsive to said pulse $T$ and said pulse $\Delta t$.

6. A phase meter for measuring the phase angle between two AC signals comprising: first means to square one of said two AC signals; second means to square the other of said two AC signals; means coupled to said first squaring means for deriving a pulse $T$ the duration of which is equal to the period of said AC signals; means coupled to said first squaring means and to said second squaring means for deriving a pulse $\Delta t$, the duration of which is equal to the time difference between said two AC signals; and means responsive to said pulse $T$ and to said pulse $\Delta t$ for computing the phase angle between said two AC signals wherein said first and second squaring means are zero axis crossing detectors, wherein said means to derive said pulse $T$ includes first and second serially connected flip-flop circuits, wherein said means to derive said pulse $\Delta t$ includes a third flip-flop circuit having an input coupled to said first squaring means and a fourth flip-flop circuit having a first input connected to the output of said third flip-flop circuit and a second input coupled to said second squaring means, and wherein said pulse $T$ and said pulse $\Delta t$ are incremented by a first clock source responsive to said pulse $T$ and said pulse $\Delta t$.

7. A phase meter for measuring the phase angle between two AC signals comprising: first means to square one of said two AC signals; second means to square the other of said two AC signals; means coupled to said first squaring means for deriving a pulse T the duration of which is equal to the period of said ac signals; means coupled to said first squaring means and to said second squaring means for deriving a pulse $\Delta t$, the duration of which is equal to the time difference between said two AC signals; and means responsive to said pulse $T$ and to said pulse $\Delta t$ for computing the phase angle between said two AC signals wherein said pulse $T$ and said pulse $\Delta t$ are incremented by a first clock source responsive to said pulse $T$ and said pulse $\Delta t$ and wherein said means to compute said phase angle comprises a first binary counter responsive to said incremented pulse $T$; a second binary counter responsive to said incremented pulse $\Delta t$ a first programmable divider connected to the output of said first binary counter; a second programmable divider connected to the output of said second binary counter; a second clock source connected to both said first and second programmable dividers; a binary coded decimal counter coupled to the output of said first programmable divider; a third binary counter coupled to the output of said second programmable divider; means coupled to said third binary counter and to said binary coded decimal counter for disabling both said binary to decimal counter and said third binary counter when said third binary counter has counted a predetermined number of count pulses from said second programmable divider; and visual readout means connected to the output of said binary coded decimal counter for providing a visual reading of the phase angle between said two AC input signals.

8. A phase meter as defined in claim 6 wherein said means to compute said phase angle comprises a first binary counter responsive to said incremented pulse $T$; a second binary counter responsive to said incremented pulse $\Delta t$; a first programmable divider connected to the output of said first binary counter; a second programmable divider connected to the output of said second binary counter; a second clock source connected to both said first and second programmable dividers; a binary coded decimal counter coupled to the output of said first programmable divider; a third binary counter coupled to the output of said second programmable divider; means coupled to said third binary counter and to said binary coded decimal counter for disabling both said binary coded decimal counter and said third binary counter when said third binary counter has counted a predetermined number of count pulses from said second programmable divider; and visual readout means connected to the output of said binary coded decimal counter for providing a visual reading of the phase angle between said two ac input signals.

9. Apparatus for measuring the phase angle between two AC signals comprising: a first zero crossing detector; means to apply one of said two AC signals to the input of said first zero crossing detector; a second zero crossing detector; means to apply the other of said AC signals to the input of said second zero crossing detector; a first synchronizer circuit connected to the output of said first zero crossing detector; a second synchronizer circuit connected to the output of said second zero crossing detector; a one shot multivibrator connected to both said first and second synchronizers; means responsive to the output of said first synchronizer for deriving a pulse $T$, the duration of which is equal to the period of said AC input signals; means responsive to the output from both said first and second synchronizers for deriving a pulse $\Delta t$, the duration of which is equal to the time difference between said ac input signals; means responsive to said pulse $T$ and pulse $\Delta t$ for incrementing said pulse $T$ and said pulse $\Delta t$; and computing means responsive to said incremented pulse $T$ and said incremented pulse $\Delta t$ for computing the phase angle between said AC input signals.

10. Apparatus as defined in claim 9 wherein said means to derive said pulse $T$ comprises: a first NOR gate having first and second inputs; means to connect the output of said first synchronizer to said second input of said first NOR gate; a first flip-flop circuit connected to the output of said first NOR gate; a second flip-flop circuit connected to the output of said first flip-flop circuit and feedback means connected between the output of said second flip-flop circuit and said first input of said first NOR gate; and wherein said means to derive said pulse $\Delta t$ comprises: a first inverter connected to the output of said second synchronizer; a second inverter connected to the output of said first synchronizer; a third flip-flop circuit having an input, a normal output and an inverted output, means to connect said input of said third flip-flop circuit to the output of said second inverter; a fourth flip-flop circuit having a first input, a second input and an output; means to connect said normal output of said third flip-flop circuit to said first input of said fourth flip-flop circuit; means to connect the output of said first inverter to said second input of said fourth flip-flop circuit; a third NOR gate having first and second inputs; means to connect said output of said fourth flip-flop to said first input of said third NOR gate, and means to connect said inverted output of said third flip-flop circuit to said second input of said third NOR gate.

11. Apparatus as defined in claim 10 wherein said means responsive to said pulse $T$ and said pulse $\Delta t$ comprises: a first NAND gate having a first input, a second input and an output; a second NAND gate having a first input, a second input and an output; a high frequency clock source; means to connect said high frequency clock source to said first input of said first NAND gate and to said first input of said second NAND gate; means to connect the output of said second flip-flop circuit to said second input of said first NAND gate and means to connect said output of said third NOR gate to said second input of said second NAND gate.

12. A phase meter as defined in claim 9 wherein said means to compute said phase angle comprises a first binary counter responsive to said incremented pulse $T$; a second binary counter responsive to said incremented pulse $\Delta t$; a first programmable divider connected to the output of said first binary counter; a second programmable divider connected to the output of said second binary counter; a second clock source connected to both said first and second programmable dividers; a binary coded decimal counter coupled to the output of said first programmable divider; a third binary counter coupled to the output of said second programmable divider; means coupled to said third binary counter and to said binary coded decimal counter for disabling both said binary coded decimal counter and said third binary counter when said third binary counter has counted a predetermined number of count pulses from said second programmable divider; and visual readout means connected to the output of said binary coded decimal counter for providing a visual reading of the phase angle between said two AC input signals.

13. Apparatus as defined in claim 11 wherein said computing means comprises: a first binary counter connected to said output of said first NAND gate; a second binary counter connected to said output of said second NAND gate; a first binary programmable divider connected to the output of said first binary counter; a second binary programmable divider connected to the output of said second binary counter; a third NAND gate having a first input, a second input and an output; a fourth NAND gate having a first input, a second input and an output; a fifth NAND gate having a plurality of inputs and an output; means to connect the output of said first programmable divider to said first input of said third NAND gate; means to connect the output of said second programmable divider to said first input of said fourth NAND gate; a third binary counter having an input connected to said output of said fourth NAND gate and a plurality of outputs corresponding in number to said plurality of inputs of said fifth NAND gate; means to connect one output of said plurality of outputs of said third binary counter to each one of said plurality of said fifth NAND gate inputs; a binary coded decimal counter connected to the output of said third NAND gate; visual readout means connected to the output of said binary coded decimal counter; and means to connect said output of said fifth NAND gate to said second input of said third NAND gate and to said second input of said fourth NAND gate to disable said third binary counter and said binary coded decimal counter when said third binary counter has reached a predetermined count.

14. Apparatus as defined in claim 13 wherein said predetermined count is 3,600 times the number of output pulses from said second programmable divider whereby said readout device indicates the phase angle between said ac input signals in tenths of a degree.

* * * * *